March 2, 1926.
L. E. DIERKS
1,574,799
ROLLER BEARING STRUCTURE
Filed Jan. 17, 1924
3 Sheets-Sheet 1
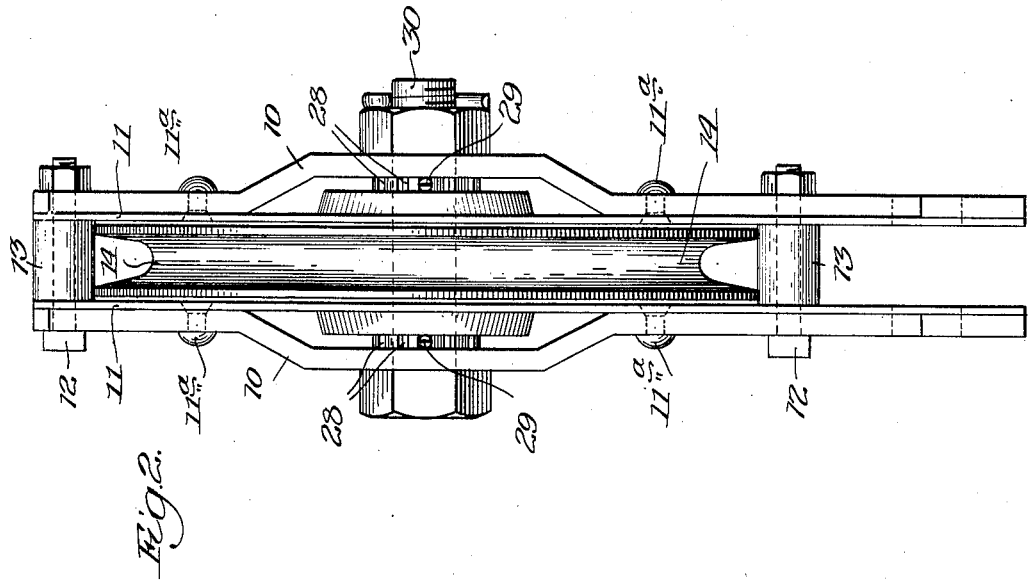
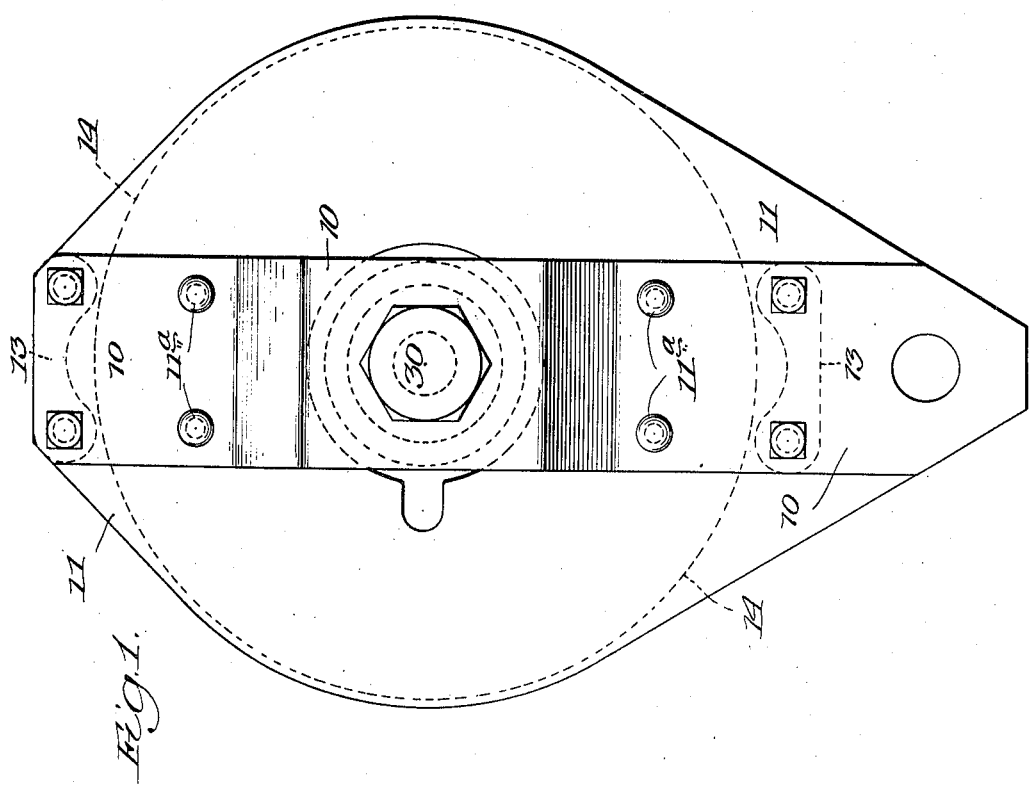

March 2, 1926.  
L. E. DIERKS  
1,574,799  
ROLLER BEARING STRUCTURE  
Filed Jan. 17, 1924  3 Sheets-Sheet 2
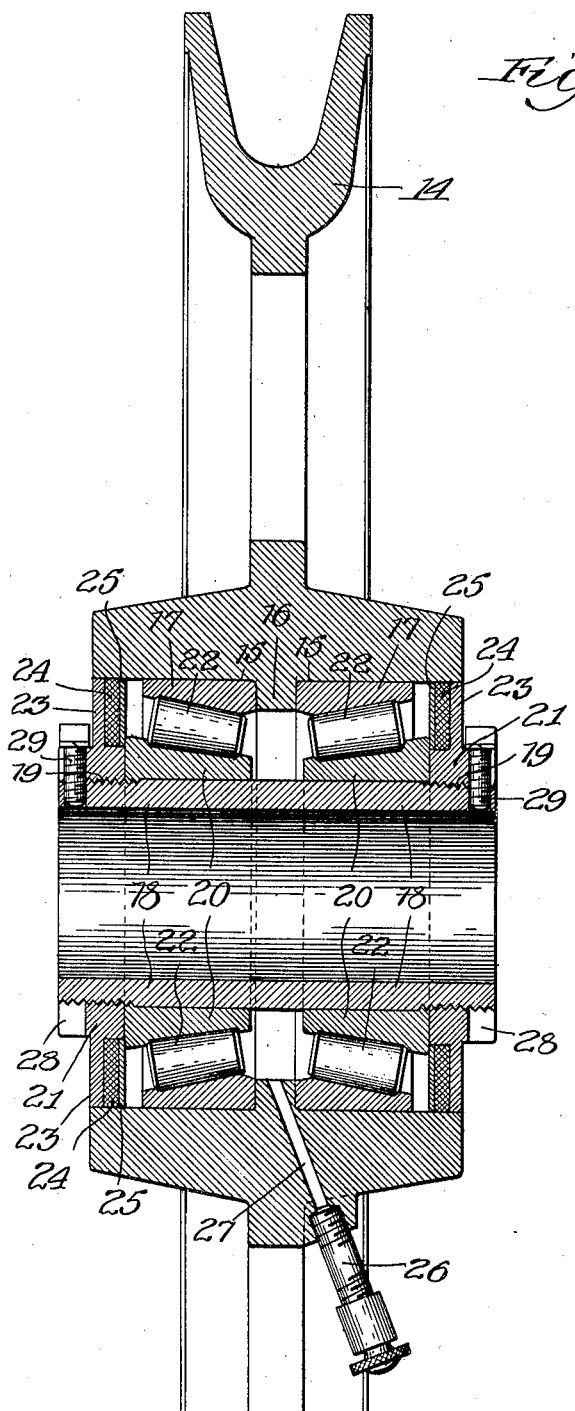
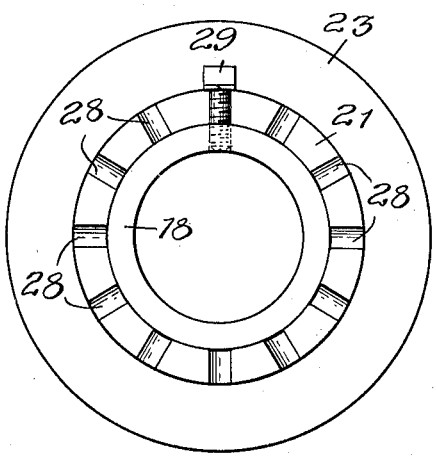
Inventor:
Louis E. Dierks,
By Dyrenforth, Lee, Chritton & Wiles,
Attys.

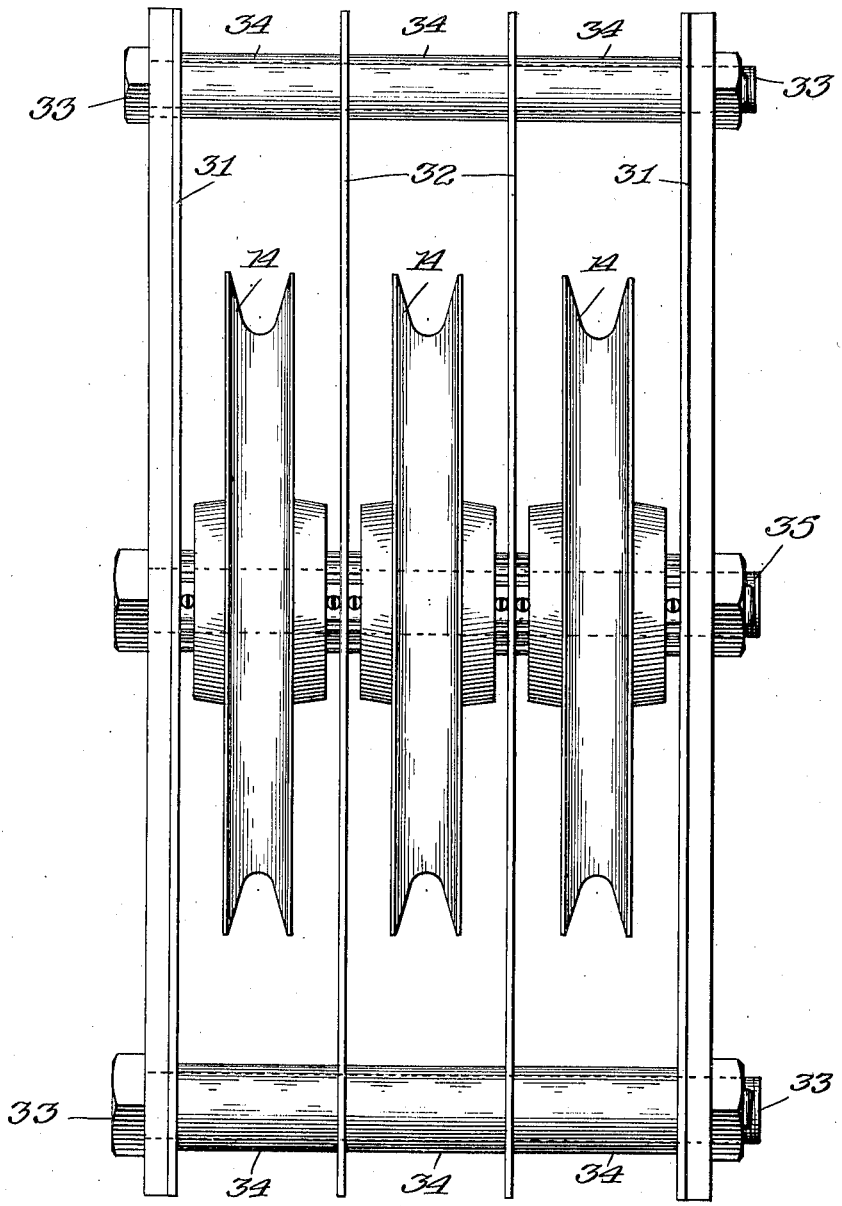

Patented Mar. 2, 1926.

1,574,799

UNITED STATES PATENT OFFICE.

LOUIS E. DIERKS, OF OAK PARK, ILLINOIS, ASSIGNOR, BY MESNE ASSIGNMENTS, TO SAUERMAN BROS., INC., OF CHICAGO, ILLINOIS, A CORPORATION OF ILLINOIS.

ROLLER-BEARING STRUCTURE.

Application filed January 17, 1924. Serial No. 686,792.

*To all whom it may concern:*

Be it known that I, LOUIS E. DIERKS, a citizen of the United States, residing at Oak Park, in the county of Cook and State of Illinois, have invented a new and useful Improvement in Roller-Bearing Structures, of which the following is a specification.

My invention relates, more particularly, through not exclusively, to sheave-structures wherein the sheave or sheaves, as the case may be, are journaled in a block.

One of my objects is to provide a novel, simple and economical construction of structure of the character above referred to, which will not be liable to become impaired.

Another object is to provide a structure of the kind referred to wherein provision is made for adjustment of the races at both ends of the structure in order that wear may be compensated for without requiring the changing of the position of the rotatable member of the structure, lengthwise of the part carrying it.

Another object is to provide, as a unitary structure, the sheave-wheel and its rolling-bearings, adapted for ready and economical assembly with similar units of any desired number, and the parts of the supporting structure, as for example the sheave-block carrying the sheave-wheels, and other objects as will be manifest from the following description.

Referring to the accompanying drawings:—

Figure 1 is a view in side elevation of a sheave device, employing a single sheave-wheel and constructed in accordance with my invention. Figure 2 is a view in front elevation of the structure shown in Fig. 1. Figure 3 is a broken sectional view of the sheave-wheel and the rolling-bearing device associated therewith. Figure 4 is an enlarged view in end elevation of the bearing structure shown in Fig. 3; and Figure 5, a view like Fig. 2 of a sheave construction employing three sheave-wheels, and constructed in accordance with my invention.

Referring to the structure shown in Figs. 1 to 4 inclusive, the sheave-block thereof comprises, in accordance with common practice, the side-bars 10 with the interposed side-plates 11 riveted to the side-bars 10 as shown at 11ª, these parts being rigidly held together substantially midway between their upper and lower ends by a sleeve and bolt structure hereinafter referred to, and at their upper and lower ends by the bolts 12 which extend though the bars 10, plates 11, and spacer members 13 located between the plates 11. The sheave-wheel represented at 14 is provided, in the opening therethrough at its center and represented at 15, with an inwardly extending circular flange 16 which forms an abutment for the inner ends of inclined raceways 17 located in the opening 15, these raceways being revoluble with the wheel 14 as by causing the raceways 17 to have driving fit with the body portion of the wheel 14. Extending through the opening 15, is a sleeve 18, the ends of which are externally threaded, as represented at 19, this sleeve carrying inner inclined raceways 20 which oppose the raceways 17. The raceways 20 are so related to the sleeve 18 that while they present the desired frictional resistance to turning on this sleeve, in the rotation of the wheel, they do not present sufficient resistance to adjustment thereof along the sleeve when pressure is exerted against their outer ends, as by the rotation of nuts represented at 21, engaging the threaded portions 19 of the sleeve 18. Interposed between, and cooperating with, the inner and outer raceways 20 and 17, respectively, are a plurality of series of rolling elements 22 shown as, and by preference, tapered rollers, the series thereof at opposite sides of the median line of the sheave-wheel 14 converging toward the axis of this wheel.

The nuts 21 are provided, between their ends, with circumferential, annular, flanges 23 which have journal fit in the ends of the opening 15, the inner ends of the nuts 21 being surrounded by felt washers 24 and retaining metal washers 25, the felt packing thus preventing leakage through the ends of the bearing structure, of lubricating grease supplied to the rollers 22, as through the grease cup represented at 26 and communicating with an opening 27 in the hub portion of the wheel and opening into the space between the series of rollers 22.

The nuts 21 may be of any desirable construction, those shown being of the type adapting them to be adjusted by the use of a spanner-wrench applied thereto, the nuts to this end containing series of radially extending slots 28, these slots also serving to receive set-screws 29 which screw into the ends of the sleeve 18, it being understood from the foregoing that when it is desired to adjust the nuts on the sleeve, the set-screws 29 are removed and after the adjustment is effected the set-crews are replaced in the sleeve in which position they extend into the adjacent ones of the slots 28.

The combined sheave-wheel and rolling-bearing structure thus provided constitutes a unitary structure which is mounted in the sheave-block in the position shown, by a bolt 30 which extends through the side members of the block and formed of the plates 10 and 11, and through the sleeve 18, the bolt 30 in being tightened rigidly clamping the side members referred to, to the sleeve 18 to securely hold these parts together and prevent turning of the sleeve, the bolt 30 forming the main means connecting the side members of the block together.

It will be understood from the foregoing that in the initial assembly of the parts of the structure the cooperating parts of the rolling-bearings may be adjusted on the sleeve 18 to the desired positions relative to each other and to a point midway between the ends of the sleeve, thereby permitting of such positioning of the parts that the wheel 14 may be caused to occupy the desired centralized position relative to the side members of the sheave-block when the sheave-wheel, with its rolling-bearing structure, is assembled with the block. Furthermore, where adjustment of the races is afterwards required, as for example in the case of wear of the bearings, the separately adjustable inner races, with the separately operable cooperating nuts 21, permit of the desired readjustment and the centralizing of the wheel in the sheave-block as adjustment is made from both ends of the wheel.

The feature of providing the sheave-wheel and rolling-bearing structure as a unit, is of especial advantage as a sheave comprising a plurality of sheave-wheels of any desired number, may be economically and readily produced by employing any desired number of such units, each having the adjusting means referred to. In Fig. 5 I have shown, by way of example, a sheave having three sheave-wheels, each of the unitary construction hereinbefore described. In this case the block of the sheave is formed of the side members, as in the case of the construction shown in Figs. 1 and 2, and represented generally at 31, and a plurality of intermediate plates 32 of a number equal to the number of sheave-wheels 14, less one. Thus in the construction shown two of the plates 32 are provided, these plates, together with the side members 31, being held together at their upper and lower ends by bolts 33 which pass through spacers 34 interposed between the side members 31 and plates 32 and between adjacent ones of these plates.

A single main securing bolt, represented at 35 extends through all of the intermediate plates 32 and side members 31 and through the sleeves 18 of the wheel-and-bearing units, the ends of these sleeves abutting the side members 31 and intermediate plates 32 of the block, and clamps the sleeves securely in place against rotation and aids in causing the block structure to present the desired degree of rigidity. It will be observed that it is possible by my construction not only to provide a sheave-structure employing as many of the sheave-wheel units as may be required, but also to independently adjust the bearings of each wheel, and provide for centralization of the latter relative to the portions of the block structure between which it extends.

While I have illustrated and described certain particular constructions embodying my invention, I do not wish to be understood as intending to limit it thereto, as the same may be variously modified and altered without departing from the spirit of the invention.

What I claim as new, and desire to secure by Letters Patent, is:

1. A pulley block comprising, in combination, a sleeve having threaded extremities, a pair of raceways mounted upon said sleeve, screw-threaded nuts coacting with the threaded extremities of the sleeve and having integral concentric flanges extending along the sleeve, and means extending through said flanges to lock the nuts and sleeve together.

2. A pulley block comprising, in combination, a sleeve having threaded extremities, a pair of raceways mounted upon said sleeve, screw-threaded nuts coacting with the threaded extremities of the sleeve and having integral concentric flanges extending along the sleeve, and means extending through said flanges to lock the nuts and sleeve together, said nuts having recesses on their inner faces adapted to receive the locking means in various adjustments relative to the sleeve, the outer faces of the nuts being adapted to receive a wrench for adjusting the nuts.

3. A pulley block comprising, in combination, a sleeve having threaded extremities, a pair of raceways upon said sleeve, a pulley having a hollow hub, raceways seated in the hollow of the hub, and rotatable elements mounted in the raceways respectively of the hub and sleeve, screw-threaded nuts coacting with the threaded extremities of the sleeve and having integral concentric flanges extending along the sleeve, and means extending through said flanges to lock the nuts and sleeve together.

4. A pulley block structure comprising, in combination, a plurality of sleeves having threaded extremities, a pair of raceways mounted upon each sleeve, screw-threaded nuts coacting with the threaded extremities of the sleeves and having integral concentric flanges extending along the sleeves, means extending through said flanges to lock the nuts and sleeves together, a plurality of pulley blocks each having a hollow hub, raceways mounted in the hollow of each hub, each pulley mounted upon one of said sleeves with rotatable elements between the raceways of the hubs and sleeves, a frame comprising end plates and intermediate plates, the assembled pulleys and sleeves mounted between said plates, and means passing through the assembled sleeves and plates to clamp the sleeves and plates firmly together.

LOUIS E. DIERKS.